United States Patent
Fisch et al.

(10) Patent No.: US 9,712,600 B2
(45) Date of Patent: Jul. 18, 2017

(54) TRANSMISSION OF NOTIFICATIONS FOR RETRIEVING AN APPLICATION ON A MOBILE CLIENT DEVICE

(71) Applicant: Facebook, Inc., Menlo Park, CA (US)

(72) Inventors: David Fisch, Palo Alto, CA (US); Teck Chia, Menlo Park, CA (US); Jordan Alperin, San Francisco, CA (US); Vijaye Ganesh Raji, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 87 days.

(21) Appl. No.: 13/706,352

(22) Filed: Dec. 6, 2012

(65) Prior Publication Data
US 2014/0164500 A1    Jun. 12, 2014

(51) Int. Cl.
*H04L 29/08* (2006.01)

(52) U.S. Cl.
CPC ............ *H04L 67/10* (2013.01); *H04L 67/303* (2013.01); *H04L 67/306* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 6,272,545 B1* | 8/2001 | Flanagin | G06F 8/61 709/201 |
| 7,275,243 B2* | 9/2007 | Gibbons | G06F 8/61 707/E17.116 |
| 7,676,802 B2 | 3/2010 | Mittal | |
| 8,126,128 B1* | 2/2012 | Hicks, III | G06F 8/61 379/114.05 |
| 8,260,881 B1* | 9/2012 | Paleja | G06F 8/60 709/217 |
| 8,261,261 B2* | 9/2012 | Tseng | G06F 8/61 717/177 |
| 8,467,817 B2* | 6/2013 | Said et al. | 455/466 |

(Continued)

FOREIGN PATENT DOCUMENTS

| | | |
|---|---|---|
| CN | 102694822 A | 9/2012 |
| WO | WO 2008/147548 | 12/2008 |

OTHER PUBLICATIONS

Yan, Tingxin, et al. "Fast app launching for mobile devices using predictive user context." Proceedings of the 10th international conference on Mobile systems, applications, and services. ACM, 2012.*

(Continued)

*Primary Examiner* — Scott B Christensen
*Assistant Examiner* — Lam Do
(74) *Attorney, Agent, or Firm* — Fenwick & West LLP

(57) ABSTRACT

An online system transmits a notification including a reference to an application to a client device associated with a user. Upon receiving an interaction with the reference to the application, the online system may transmit instructions for retrieving the application to an additional client device associated with the user. For example, if the client device used to interact with the reference has a device type different than a device type associated with the application, the online system selects an additional client device having a device type matching the device type associated with the application to receive the instruction for retrieving the application.

16 Claims, 2 Drawing Sheets

(56) References Cited

U.S. PATENT DOCUMENTS

| | | | | |
|---|---|---|---|---|
| 8,554,190 | B2* | 10/2013 | Smith et al. | 455/418 |
| 8,572,033 | B2* | 10/2013 | Shukla | 707/620 |
| 8,743,130 | B2* | 6/2014 | Mahajan et al. | 345/522 |
| 2006/0173974 | A1* | 8/2006 | Tang | H04L 63/029 709/217 |
| 2006/0218287 | A1* | 9/2006 | Dodrill et al. | 709/227 |
| 2007/0239833 | A1* | 10/2007 | Alperin | H04L 12/58 709/206 |
| 2008/0242284 | A1 | 10/2008 | Vechey et al. | |
| 2008/0275951 | A1* | 11/2008 | Hind et al. | 709/204 |
| 2009/0043657 | A1* | 2/2009 | Swift et al. | 705/14 |
| 2009/0055749 | A1* | 2/2009 | Chatterjee et al. | 715/738 |
| 2010/0070586 | A1* | 3/2010 | Lawrence et al. | 709/206 |
| 2010/0205274 | A1 | 8/2010 | Gharabally et al. | |
| 2010/0306762 | A1 | 12/2010 | Lindberg et al. | |
| 2012/0079606 | A1* | 3/2012 | Evans | G06F 21/10 726/28 |
| 2012/0124028 | A1 | 5/2012 | Tullis et al. | |
| 2012/0166532 | A1 | 6/2012 | Juan et al. | |
| 2012/0198268 | A1 | 8/2012 | Qureshi | |
| 2012/0302222 | A1* | 11/2012 | Williamson et al. | 455/418 |
| 2013/0047146 | A1* | 2/2013 | Ugur | G06Q 50/01 717/172 |
| 2013/0085886 | A1* | 4/2013 | Satish | G06Q 30/02 705/26.7 |
| 2013/0111328 | A1* | 5/2013 | Khanna et al. | 715/234 |
| 2013/0124691 | A1* | 5/2013 | Suryavanshi | H04L 67/06 709/219 |
| 2013/0166376 | A1* | 6/2013 | Cohen | G06Q 30/02 705/14.45 |
| 2013/0219381 | A1* | 8/2013 | Lovitt | G06F 8/65 717/173 |
| 2013/0254024 | A1* | 9/2013 | Woods | G06Q 30/02 705/14.51 |
| 2013/0290369 | A1* | 10/2013 | Sayers et al. | 707/769 |
| 2014/0006538 | A1* | 1/2014 | Oikonomou | 709/213 |
| 2014/0007057 | A1* | 1/2014 | Gill | G06F 8/61 717/126 |
| 2014/0052683 | A1* | 2/2014 | Kirkham | G06Q 30/0631 706/46 |
| 2014/0096025 | A1* | 4/2014 | Mandel et al. | 715/739 |
| 2014/0123157 | A1* | 5/2014 | Keskitalo et al. | 719/328 |

OTHER PUBLICATIONS

Charland, Andre, and Brian Leroux. "Mobile application development: web vs. native." Communications of the ACM 54.5 (2011): 49-53.*

"Introducing Amazon Appstore for Android" http://phx.corporate-ir.net/phoenix.zhtml?c=176060&p=irol-newsArticle&ID=1541548, Mar. 22, 2011.*

European Patent Office, Search Report and Opinion, European Patent Application No. 13195705.2, Feb. 10, 2014, seven pages.

PCT International Search Report and Written Opinion, PCT Application No. PCT/US2013/073169, Mar. 19, 2014, fifteen pages.

Canadian Office Action, Canadian Application No. 2,892,154, May 10, 2016, 4 pages.

European Patent Office, Examination Report, European Patent Application No. 13195705.2, Jun. 21, 2016, five pages.

Canadian Intellectual Property Office, Office Action, Canadian Patent Application No. 2,892,154, Feb. 6, 2017, three pages.

* cited by examiner

TRANSMISSION OF NOTIFICATIONS FOR RETRIEVING AN APPLICATION ON A MOBILE CLIENT DEVICE

BACKGROUND

This disclosure generally relates to online systems, and in particular to transmitting notifications to online system users.

Third party systems may provide applications to users to increase user engagement, revenue, and other goals. To distribute an application to users, third party systems may provide users with access to a link to download a client application in an advertisement or another type of message. By accessing the link, the application is downloaded from the third party system or from another source and installed on the client device from which the application was accessed.

However, users typically use multiple devices when accessing online content. For example, users may access online content from a desktop computer as well as a mobile device, such as a smart phone. Hence, a user may be presented with a link to download a client application for a device different than the device used by the user to access the link. In this scenario, the user is unable to download the application by simply accessing the link. However, sending multiple messages identifying an application to different devices may inundate a user, potentially discouraging the user from installing the application.

SUMMARY

An online system, such as a social networking system, provides a notification to users of the online system for retrieving an application via a client device. The application is provided from an application provider, which may be a third party website or system separate from the online system. To provide the notification, the online system stores associations between a user of the online system and a plurality of client devices associated with the user. For example, the online system stores a mapping between a user identification of a user and identifiers of different client devices used by the user to access the online system. The mapping may also identify a device type for each of the identifiers of client devices. For example, a device type may indicate whether a client device uses an embedded operating system, such as a mobile operating system, or uses a desktop operating system.

The online system generates a notification including a reference to an application provided by an application provider. For example, the online system receives a request to communicate the notification to one or more users. As another example, the online system may receive interactions with the application from its users and generate a notification describing the interactions. The reference to the application in the notification includes information for retrieving the application for installation on a client device. For example, the notification may be an advertisement including a link to a third party website associated with the application provider for retrieving an application for installation. The online system transmits the notification including the reference to a client device.

When the online system receives an interaction with the reference from the user via the client device, the online system transmits data for retrieving the application to an additional client device. For example, the online system determines if the client device from which the interaction was received has a device type associated with the application; if the client device has a different device type than associated with the application, the online system retrieves a client device associated with the user associated with a client device having a device type matching that associated with the application. For example, the transmitted data includes instructions configured to be executed by an application associated with the online system and executing on the additional client device. In another example, the transmitted data includes instructions configured to be executed by a native application executing on the additional client device, which is an application specifically designed to be executed by a device's operating system and machine firmware.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION

System Architecture

Figure 1:
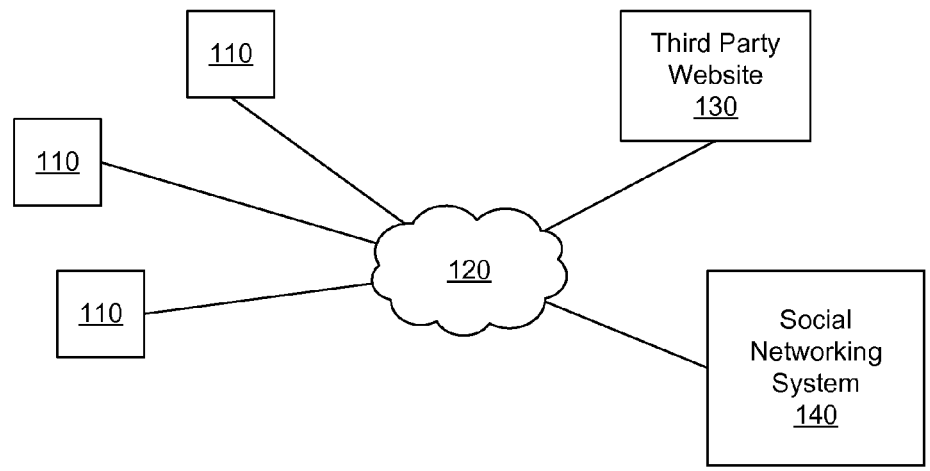
FIG. 1 is a block diagram of a system environment in which an online system operates, in accordance with an embodiment.

FIG. 1 is a high level block diagram illustrating a system environment 100 for an online system. The system environment 100 comprises one or more client devices 110, a network 120, one or more third-party websites 130, and an online system, such as a social networking system 140. In alternative configurations, different and/or additional components may be included in the system environment 100. While described with reference to the social networking system 140, the embodiments described herein may be adapted to online systems that are not social networking systems 140. For example, the online system may include an advertisement system or other system for exchanging information among its users.

A client device 110 is a computing device capable of receiving user input as well as transmitting and/or receiving data via the network 120. In one embodiment, a client device 110 is a conventional computer system, such as a desktop or laptop computer. In another embodiment, a client device 110 may be a device having computer functionality, such as a personal digital assistant (PDA), mobile telephone, smartphone or similar device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) that runs on the native operating system of the client device 110, such as IOS® or ANDROID™.

Hence, different client devices 110 may have different device types that may differently execute application. For example, a client device 110 may execute native applications, which are specifically designed to be executed on the client device's operating system and firmware (but may be modified for execution by different client devices 110 having different operating systems and/or firmware). Alternatively, a client device 110 may execute applications configured to be executed by a type of operating system independent of the firmware or hardware of the client device 110 on which it is executed. A device type may indicate whether a client device 110 executes an embedded operating system or a desktop operating system.

The client devices 110 are configured to communicate via the network 120, which may comprise any combination of local area and/or wide area networks, using both wired and wireless communication systems. In one embodiment, the network 120 uses standard communications technologies and/or protocols. Thus, the network 120 may include links using technologies such as Ethernet, 802.11, worldwide interoperability for microwave access (WiMAX), 3G, 4G, code division multiple access (CDMA), digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

A third party website 130 may be coupled to the network 120 for communicating with the social networking system 140, which is further described below in conjunction with FIG. 2. In one embodiment, the third party website 130 is an application provider communicating information describing applications for execution by a client device 110 or communicating data to client devices 110 for use by an application executing on the client device. The third party website 130 may also communicate information to the social networking system 140, such as advertisements or information about an application provided by the third party website 130.

Figure 2:
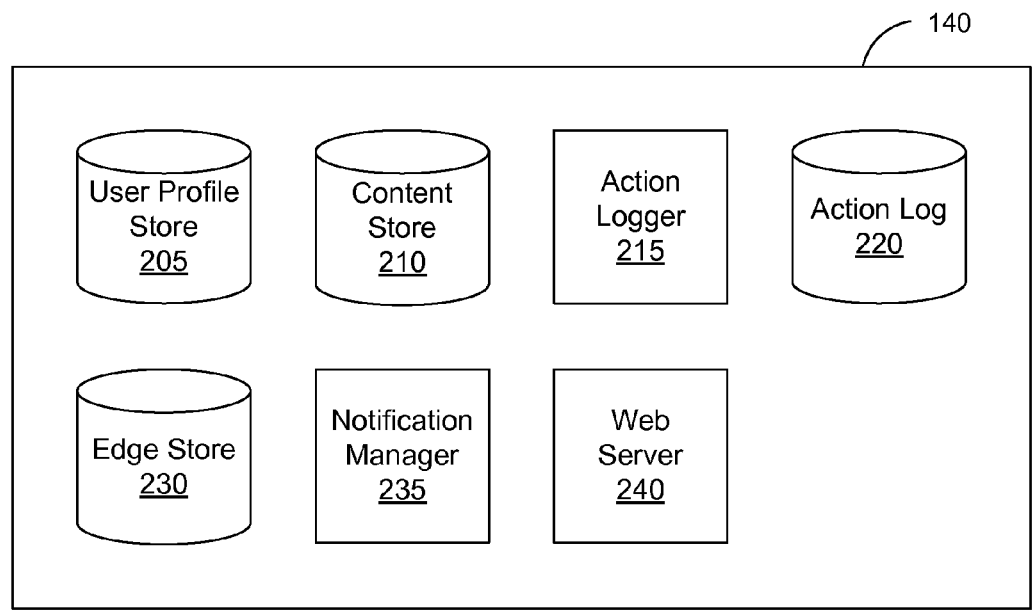
FIG. 2 is a block diagram of an online system, in accordance with an embodiment.

FIG. 2 is an example block diagram of an architecture of the social networking system 140. The social networking system 140 includes a user profile store 205, a content store 210, an action logger 215, an action log 220, an edge store 230, a notification manager 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user, and may also include profile information inferred by the social networking system 140. In one embodiment, a user profile includes multiple data fields, each data field describing one or more attributes of the corresponding user of the social networking system 140. The user profile information stored in user profile store 205 describes the users of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

Additionally, a user profile includes information for communicating with a corresponding user outside of the social networking system 140. For example, the user profile includes one or more electronic mail (email) addresses for communicating content to the user through an email server, or other third party website 130, external to the social networking system 140. As another example, a user profile includes a telephone number or other contact information for interacting with a corresponding user through a communication channel outside of the social networking system 140.

A user profile may also identify one or more client devices 110 associated with a user. For example, the user profile includes identifiers associated with each client device 110 the user has used to access the social networking system 130 or includes identifiers associated with client devices 110 identified by the user. In one embodiment, a device type is associated with a client device identifier. For example, the identifier indicates whether the client device 110 corresponding to the identifier operates an embedded operating system or another type of operating system.

While user profiles in the user profile store 205 are frequently associated with individuals, allowing people to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 140, such as status updates, photos tagged by users to be associated with other objects in the social networking system, events, groups or applications. In some embodiments, objects are received from third-party applications, which may be external to the social networking system 140. Content "items" represent single pieces of content that are represented as objects in the social networking system 140. Users of the social networking system 140 are encouraged to communicate with each other by posting text and content items of various types of media through various communication channels, increasing the interaction of users with each other and increasing the frequency with which users interact within the social networking system 140.

The action logger 215 receives communications about user actions on and/or off the social networking system 140, populating the action log 220 with information about user actions. Such actions may include, for example, adding a connection to another user, sending a message to another user, uploading an image, reading a message from another user, viewing content associated with another user, attending an event posted by another user, interacting with a link included in a news story or advertisement, among others. In some embodiments, the action logger 215 identifies interaction between a social networking system user and a brand page within the social networking system 140, which communicates targeting criteria associated with content on the brand page to a content selector to customize content from the brand page. In addition, a number of actions described in connection with other objects are directed at particular users, so these actions are associated with those users as well. These actions are stored in the action log 220.

The action log 220 may be used by the social networking system 140 to track user actions on the social networking system 140, as well as external websites 130 that communicate information to the social networking system 140. Users may interact with various objects on the social networking system 140, including commenting on posts, sharing links, and checking-in to physical locations via a mobile device, accessing content items or other interactions. Information describing these actions is stored in the action log 220. Additional examples of interactions with objects on the social networking system 140 included in the action log 220 include commenting on a photo album, communications between users, becoming a fan of a musician, adding an event to a calendar, joining a groups, becoming a fan of a brand page, creating an event, authorizing an application, using an application and engaging in a transaction. Additionally, the action log 220 records a user's interactions with advertisements on the social networking system 140 as well as other applications operating on the social networking system 140. For example, the action log 220 stores a user's interactions with notifications and with content included in the notifications, such as a link. In some embodiments, data from the action log 220 is used to infer interests or preferences of the user, augmenting the interests included in the user profile and allowing a more complete understanding of user preferences.

The action log 220 may also store user actions taken on external websites, such as third party website 130. For example, an e-commerce website that primarily sells sporting equipment at bargain prices may recognize a user of a social networking system 140 through social plug-ins that enable the e-commerce website to identify the user of the social networking system 140. Because users of the social networking system 140 are uniquely identifiable, e-commerce websites, such as this sporting equipment retailer, may use the information about these users as they visit their websites. The action log 220 records data about these users, including webpage viewing histories, advertisements that were engaged, purchases made, and other patterns from shopping and buying.

In one embodiment, an edge store 230 stores the information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

The edge store 230 stores information describing characteristics of edges, such as affinity scores for objects, interests, and other users. Affinity scores may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in the edge store 230, in one embodiment. In some embodiments, connections between users may be stored in the user profile store 205, or the user profile store 205 may access the edge store 230 to determine connections between users.

The notification manager 235 generates notifications providing information or other content to users of the social networking system 140. For example, the social networking system 140 receives information associated with an application from a third party website 130, such as an application provider, and generates notifications identifying the application for transmission to users of the social networking system 130 via the web server 240 and the network 120. The received information includes information describing the application and may include information for retrieving the application from the third party website 130 or from another application provider. In one embodiment, the received information may be an advertisement including a reference, such as a link, for retrieving the application. As another example, the notification manager 235 generates a notification when the action log 220 indicates one or more users have interacted with an application. In other embodiments, the reference may be included in a recommendation unit, news story, or other content item suitable to engage the attention of a user. Additionally, if the social networking system 140 receives an interaction with a notification including a reference to an application, the notification manager 235 may communicate data for retrieving the application to another client device 110 associated with the user.

The notification manager 235 maintains records of the client devices 110 eligible to receive notifications for each user and may also maintain data describing user activity on client devices 110 associated with a user. Client devices 110 eligible to receive a notification include client devices 110 associated with the user by the social networking system 140 and that the user identifies as devices for receiving a notification. Additional information may be used to determine if a client device 110 is eligible to receive a notification. In one embodiment, the client device 110 is identified as eligible or ineligible for notifications based on a device type associated with the client device 110. In another embodiment, the client device 110 is identified as eligible to receive a notification based on whether a user is logged into an account associated with the social networking system 140 from a client device 110 having a particular device type, such as a mobile device.

The notification manager 235 records the user interactions with notifications on client devices 110. For each interaction by a user, the notification manager 235 identifies the client device 110 from which the interaction was received and may also associate a timestamp with the received interaction. When a user interacts with a reference to an application included in a notification, the notification manager 235 identifies the client device 110 from which the interaction was received and determines if a device type of the identified client device 110 corresponds to a device type associated with the application. If the device type of the identified client device 110 does not match the device type associated with the application, the notification manager 235 identifies an additional client device 110 associated with the user and having the matching device type from the user profile of the user. The notification manager 235 then sends the information for retrieving the application to the additional client device 110. For example, the notification manger 235 may send a notification including a reference to an application for a mobile device to a desktop device associated with a user and transmit instructions for retrieving the application to a mobile device to the user if an interaction with the notification is received from the desktop computer.

The web server 240 links the social networking system 140 via the network 120 to the one or more client devices 110, as well as to the one or more third party websites 130. The web server 240 serves web pages, as well as other web-related content, such as JAVA®, FLASH®, XML and so forth. The web server 240 may provide the functionality of receiving and routing messages between the social networking system 140 and the client device 110, for example, instant messages, queued messages (e.g., email), text and SMS (short message service) messages, or messages sent using any other suitable messaging technique. A user may send a request to the web server 240 to upload information, for example, images or videos that are stored in the content store 210. Additionally, the web server 240 may provide application programming interface (API) functionality to send data directly to native client device operating systems, such as IOS®, ANDROID™, WEBOS® or RIM.

Application Installation

Figure 3:
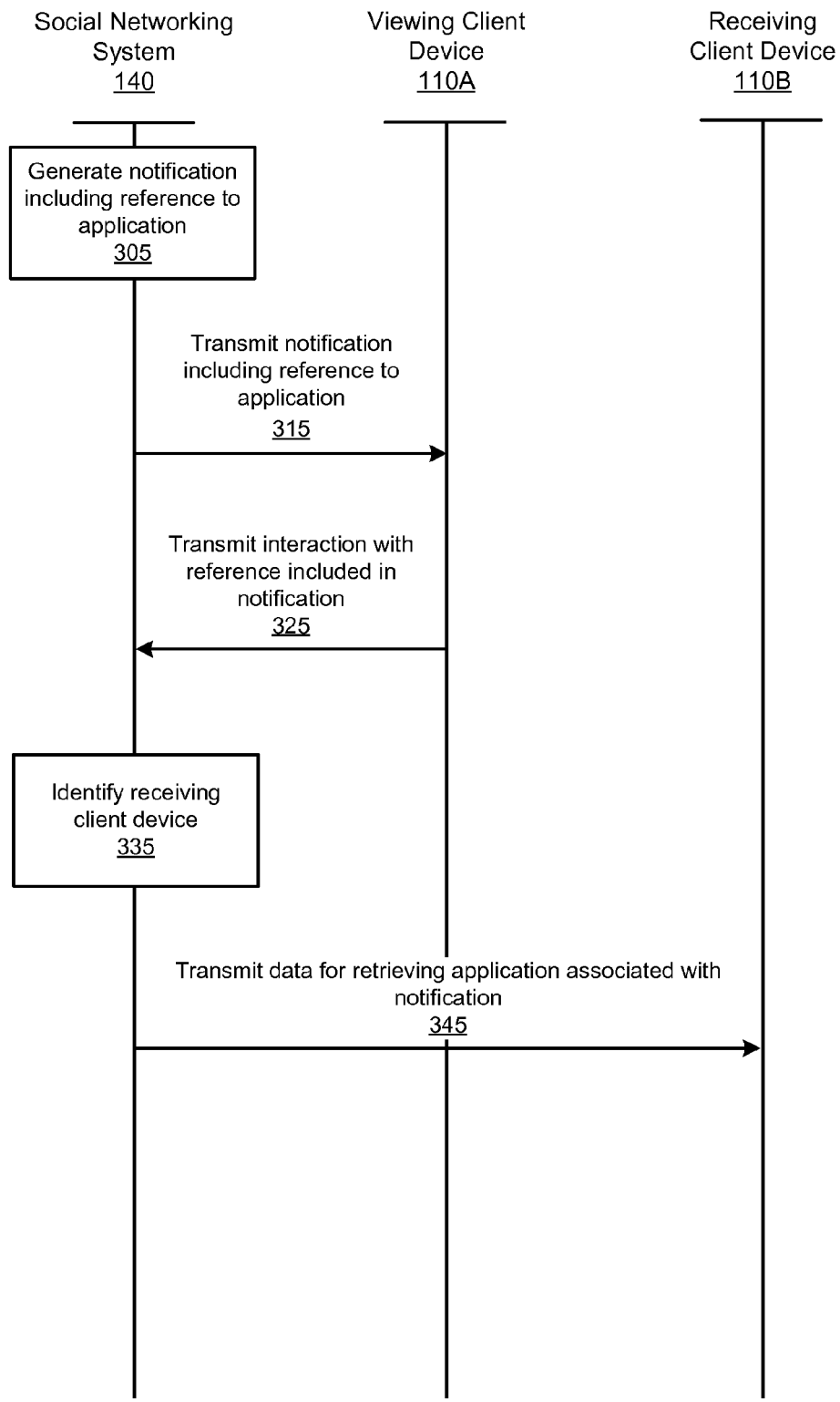
FIG. 3 is an interaction diagram of a method for transmitting a notification for retrieving an application to a user of an online system, in accordance with an embodiment.

FIG. 3 is an interaction diagram of one embodiment of a method for providing information for retrieving an application based on interaction with a notification from an online system. The social networking system 140 stores associations between a user of the social networking system 140 and a plurality of client devices 110. As described above in conjunction with FIG. 2, a user profile may include a mapping between client device identifiers and a user corresponding to the user profile. The mapping may also identify a device type associated with each of the client device identifiers. For example, a device type may indicate whether a client device corresponding to a client executes an embedded operating system, such as a mobile operating system, or executes a desktop operating system.

Based on information associated with an application provided by an application provider, such as a third party website 130, the social networking system 140 generates 305 a notification for retrieving the application on a client device 110. For example, the social networking system 140 receives a request from the application provider to present an advertisement to its users about the application or to otherwise notify its users of the application. As another example, the notification may be generated 305 based on interactions with the application by social networking system users. In one embodiment, the notification includes a reference to the application provided by the application provider, such as a link for downloading the application from the application provider. For example, the notification may be an advertisement including a link to retrieving the application from the application provider. The application may be associated with a particular device type; for example, the application may be configured to execute on a mobile device and not on a desktop device, and the social networking system 140 may maintain data indicating the device type associated with the application or with the reference to the application.

The social networking system 140 transmits 315 the notification to a viewing client device 110A, such as a desktop device, via the network 120. Because the notification includes a reference to the application, the user of the viewing client device 110A may retrieve the application by interacting with the reference. A user interaction with the reference included in the notification is transmitted 325 from the viewing client device 110A to the social networking system 140 via the network 120. For example, if the user accesses a link in the notification, an indication of the access is transmitted 325 to the social networking system 140 along with an identifier or description of the viewing client device 110A. Other interactions with the notification may be transmitted 325 to the social networking system 140, such as sending a text message forwarding the notification, sending an email forwarding the notification, sharing the notification with another user, or any other suitable interaction involving the notification.

Based on the interaction with the reference included in the notification, the social networking system 140 determines if the viewing client device 110A has a device type corresponding to a device type associated with the application. If the device type of the viewing client device 110A does not correspond to the device type associated with the application, the social networking system 140 identifies 335 a receiving client device 110B associated with the user that interacted with the reference. For example, a user profile of the user interacting with the reference is accessed and a client device identifier different than the client device identifier of the viewing client device 110A is retrieved; the receiving client device 110B may have a device type matching a device type associated with the application or may have a device type different than the device type of the viewing client device 110A.

The social networking system 140 transmits 345 data for retrieving the application to the identified receiving client device 110B. For example, the transmitted data includes instructions configured to be executed by an application associated with the online system and executing on the receiving client device 110B. As another example, the transmitted data includes instructions configured to be executed by a native application executing on the additional client device. As used herein, a native application refers to an application specifically designed to be executed by a device's operating system and machine firmware.

Although described with reference to a social networking system 140, the preceding description may be used with other online systems that generate and/or transmit notifications to users. For example, the preceding description may also be used by an online system configured to maintain records of devices of its users eligible to receive notifications and receive interactions describing user interactions with notifications.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   storing, at an online system, a profile of a user of the online system, the profile including information identifying a plurality of client devices of the user;
   transmitting a first notification from the online system to a viewing client device associated with the user, the first notification including a reference to an application provided by an application provider;
   receiving a request to install the application from the viewing client device of the user, the request being made by an interaction with the reference to the application included in the notification;
   responsive to the request, determining, by the online system without receiving interaction from the user, if the viewing client device from which the interaction was received has a device type supported by the application;
   responsive to a determination by the online system without receiving interaction from the user that the viewing client device from which the interaction was received has a different device type from the device type supported by the application, identifying, by the online system without receiving interaction from the user, a receiving client device of the user having a device type supported by the application using the plurality of client devices of the user stored in the user's profile information; and
   transmitting a second notification to the receiving client device from the online system without receiving interaction from the user, the second notification including a link to install the application on the receiving client device.

2. The method of claim 1, wherein the reference to the application comprises a link to a third party website associated with the application provider.

3. The method of claim 1, wherein the receiving client device is a mobile device.

4. The method of claim 1, wherein an association between a user of the online system and a client device indicates a type associated with the client device.

5. The method of claim 1, wherein the online system is a social networking system.

6. The method of claim 1, wherein the instructions are configured to be executed by an application associated with the online system and executing on the receiving client device.

7. The method of claim 1, wherein the instructions are configured to be executed by a native application executing on the receiving client device.

8. A method comprising:
   storing, at an online system, a profile of a user of the online system, the profile including device identifiers of a plurality of client devices of the user;
   transmitting a first notification from the online system to a viewing client device associated with the user, the first notification including a reference to an application provided by an application provider;
   receiving a request to install the application from the viewing client device of the user, the request being made by an interaction with the reference to the application included in the notification;
   responsive to the request, determining by the online system without receiving interaction from the user if the viewing client device from which the interaction was received has a device type supported by the application;
   responsive to a determination, by the online system without receiving interaction from the user, that the viewing client device from which the interaction was received has a different device type from the device type supported by the application, identifying, by the online system without receiving interaction from the user, a receiving client device of the user having a device type supported by the application using the device identifiers of the plurality of client devices of the user stored in the user's profile information; and transmitting a second notification from the online system to the receiving client device responsive to the identifying without receiving interaction from the user, the second notification including a link to install the application on the receiving client device.

9. The method of claim 8, wherein the reference to the application comprises a link to a third party website associated with the application provider.

10. The method of claim 8, wherein the receiving client device is a mobile device.

11. The method of claim 8, wherein generating, at the online system, the notification including the reference to the application provided by the application provider comprises:
   receiving, at the online system, from the application provider, information associated with an application; and
   generating the notification including the reference to the application provided by the application provider based on the received information.

12. The method of claim 8, wherein generating, at the online system, the notification including the reference to the application provided by the application provider comprises:
   receiving the notification from the application provider.

13. The method of claim 12, wherein the viewing client device and the receiving client device have different device types.

14. The method of claim 8, wherein the instructions are configured to be executed by an application associated with the online system and executing on the receiving client device.

15. The method of claim 8, wherein the instructions are configured to be executed by a native application executing on the receiving client device.

16. A non-transitory computer readable medium comprising instructions that when execute by a processor, cause the processor to:
   store, at an online system, a profile of a user of the online system, the profile including information identifying a plurality of client devices of the user;
   transmit a first notification from the online system to a viewing client device associated with the user, the first notification including a reference to an application provided by an application provider;
   receive a request to install the application, from the viewing client device of the user, the request being made by an interaction with the reference to the application included in the notification;
   responsive to the request, determine, by the online system without receiving interaction from the user, if the viewing client device from which the interaction was received has a device type supported by the application;
   responsive to a determination by the online system without receiving interaction from the user that the viewing client device from which the interaction was received has a different device type from the device type supported by the application, identify, by the online system without receiving interaction from the user, a receiving client device of the user having a device type supported by the application using the plurality of client devices of the user stored in the user's profile information; and
   transmit a second notification to the receiving client device from the online system without receiving interaction from the user, the second notification including a link to install the application on the receiving client device.

* * * * *

UNITED STATES PATENT AND TRADEMARK OFFICE
CERTIFICATE OF CORRECTION

PATENT NO. : 9,712,600 B2
APPLICATION NO. : 13/706352
DATED : July 18, 2017
INVENTOR(S) : David Fisch et al.

Page 1 of 1

It is certified that error appears in the above-identified patent and that said Letters Patent is hereby corrected as shown below:

In the Claims

Column 10, Line 37, after "the" delete "instructions are" insert -- link is --.

Column 10, Line 41, after "the" delete "instructions are" insert -- link is --.

Column 11, Line 14, after "wherein," delete "generating, at the" insert -- transmitting, from the --.

Column 11, Line 20, after "the" insert -- first --.

Column 11, Line 23, after "wherein," delete "generating, at the" insert -- transmitting, from the --.

Column 11, Line 25, after "the" insert -- first --.

Column 11, Line 29, after "the" delete "instructions are" insert -- link is --.

Column 11, Line 33, after "the" delete "instructions are" insert -- like is --.

Signed and Sealed this
Twentieth Day of February, 2018

Andrei Iancu
*Director of the United States Patent and Trademark Office*